Oct. 26, 1954
A. E. RINEER
2,692,512
FOOT PEDAL
Filed Nov. 19, 1948
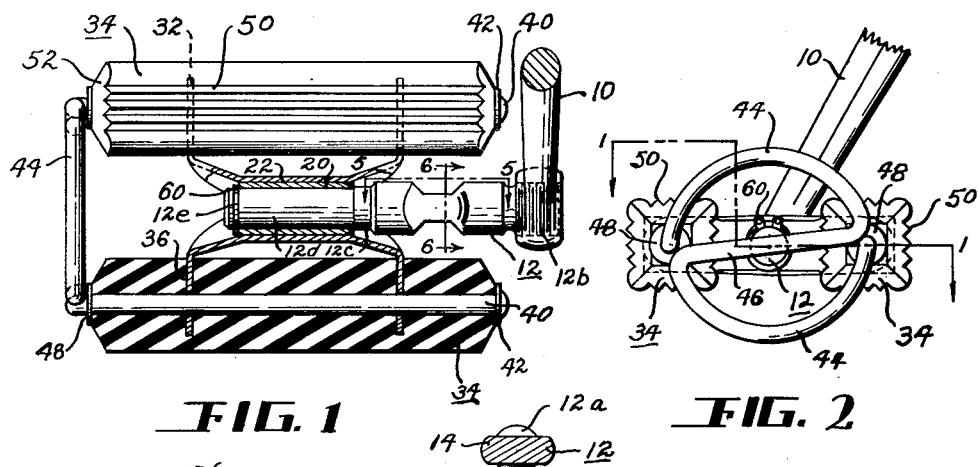
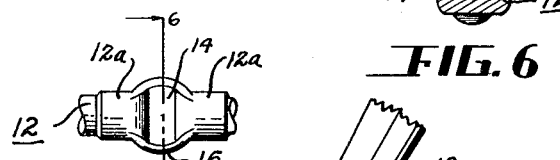
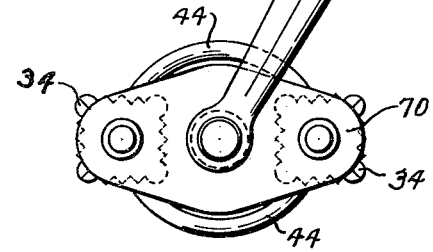
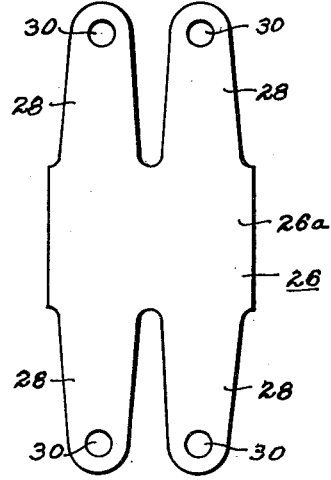
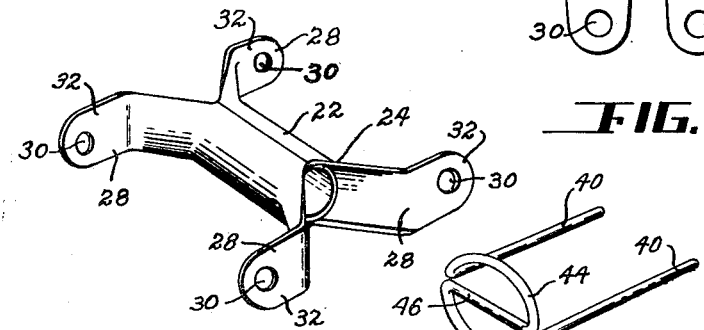
INVENTOR.
Arthur E. Rineer
BY
Dybvig & Dybvig
HIS ATTORNEYS Patented Oct. 26, 1954

2,692,512

UNITED STATES PATENT OFFICE 2,692,512

FOOT PEDAL

Arthur E. Rineer, Centerville, Ohio, assignor of one-half to Rudolph Platzer, Dayton, Ohio Application November 19, 1948, Serial No. 60,891

10 Claims. (Cl. 74—594.4)

This invention relates to a foot pedal and more particularly to a pedal adapted for use on a bicycle or a tricycle, although not necessarily so limited.

An object of this invention is to provide a foot pedal that is inexpensive, consisting of few parts, easily produced, utilizing stampings, formed parts, and screw machine parts, resulting in a pedal that is strong, dependable, efficient and long-lived.

Other objects and advantages reside in the construction of parts, the combination thereof and the mode of operation, as will become more apparent from the following description.

Referring to the drawings, Figure 1 is a top plan view of a pedal, a portion of which is shown in cross section taken substantially on the line 1—1 of Figure 2.

Figure 2 is an end view of the pedal, as viewed from the left of Figure 1.

Figure 3 is a plan view of a sheet metal blank or stamping that is used in forming the frame structure for the pedal and the housing for the bearing.

Figure 4 discloses the member disclosed in Figure 3 after it has been formed and the bearing inserted therein.

Figure 5 is a fragmentary, top plan view of a pedal supporting spindle.

Figure 6 is a cross sectional view of the spindle taken substantially on the line 6—6 of Figures 1 and 5.

Figure 7 is a perspective view of the wire frame support for the treads, drawn to a reduced scale.

Figure 8 is an end view of a modification.

In the drawings, the crank arm 10 may be a crank on a bicycle, a tricycle, a motorcycle, various types of toys, et cetera. The end of the crank is provided with a threaded aperture receiving the threaded end of a spindle 12.

The spindle 12 may be a screw machine part. When the piece comes out of the screw machine, it has an enlarged portion 12a, a threaded portion 12b extending into the threaded aperture of the crank arm 10, a reduced portion 12c, a bearing surface 12d, and an annular groove 12e. After the spindle 12 has been produced in the screw machine, it is preferably placed in a punch press die, so as to form the wrench-engaging portion 14, consisting of the flattened surfaces subtended by a widened portion 16, resulting from the flattening of the spindle. The flattened surfaces 14 constitute wrench-engaging portions for use when tightening or loosening the spindle from the crank arm 10.

The bearing surface 12d is journalled in a bearing 20, which may be a self-lubricating bearing made from powdered metal, as is well-known to those skilled in the art. The bearing 20 is mounted within a tubular portion 22, constituting a portion of the frame 24 of the pedal.

The frame 24 is made from a sheet metal blank 26, shown in Figure 3. This sheet metal blank may be stamped from a piece of sheet metal by a suitable die. After it has been stamped, the center portion 26a may be curved so as to form a tubular housing portion 22. Instead of being curved, the bearing supporting portion could be formed into any other suitable shape, as for example, a square opening. Furthermore, the frame could be made from two pieces abutting each other along suitable edges, as for example, along serrated edges. The powdered metal could be sintered with the housing therefor in place, so as to thereby braze the parts together in the same heating operation that forms the porous metal bearing. Arms or arm portions 28 are deflected from the longitudinal axis of the tubular housing 22. Each arm portion 28 is provided with a transverse curvature having a radius of curvature substantially equal to the radius of the housing 22. The arm portions 28 terminate in radially disposed flat portions or terminals 32, each of which is apertured.

A pair of tread members 34 are provided with longitudinally extending apertures registering with the apertures 30 in the arm portions 28. Furthermore, the tread members 34 have been provided with rectangular laterally disposed slots 36, into which the flat terminals 32 of the arms project.

In order to give the tread members 34 rigidity, a pair of wire-like arms 40 extend through the apertures in the tread members and through the apertures 30 in the arms 28. Ane end of each of these arms 40 is upset and abuts a washer 42 engaging one end of the tread members 34. The two arms 40 are integral, being joined by a substantially inverted S-shaped portion consisting of the arcuate portions 44 and the transverse portion 46, as best shown in Figures 2 and 8.

Suitable washers 48 are located between the ends of the tread members and the inverted S-shaped portion consisting of the arcuate portion 44 and the straight portion 46. The arcuate portions 44, in addition to supporting the arms 40 mounted within the tread members, also function to provide a lateral stop, preventing the foot from slipping off the end of the pedal. The sides of the tread members 34 are provided with ribs or corrugations 50. The ends 52 adjacent the washers 42 and 48 are bevelled, so as to eliminate sharp corners.

After the frame structure and the tread members 34 have been assembled, the bearing mounted within the tubular housing and the reduced portion 12d of the spindle 12 is inserted in the bearing 20 and locked in position by a spring-retaining member 60. This results in a pedal wherein the tread members are supported intermediate their ends, the parts constituting the metallic frame structure of the pedal being made from a sheet metal stamping and from a formed wire member, resulting in an inexpensive assembly.

In the event it is found desirable for some purposes to prevent the foot from slipping inwardly towards the crank arm 10, a suitable retaining member may be used, as disclosed in the modification shown in Figure 8, which will now be described.

In this modification, the entire structure described hereinbefore is used, with the exception that instead of the washers 42, a piece 70 of sufficiently heavy sheet metal has been used. Piece 70 is provided with a pair of apertures, one near each end, receiving ends of the arms 40. The ends are upset so as to hold the piece 70 in contact with the ends of the tread members.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A foot pedal including a sheet metal frame member, said sheet metal frame member including a tubular portion, a bearing housed in the tubular portion, said frame member having two pairs of arms deflected outwardly from the tubular portion, each arm terminating in a radially disposed portion provided with an aperture, a pair of tread members provided with laterally disposed slots into which the radially disposed portions project, the tread members being provided with longitudinally extending apertures registering with the apertures in the radially disposed portions, and a wire-like member including a pair of arm-like portions extending through the apertures in the tread members and the apertures in the radially disposed portions for holding the tread members in fixed relation with respect to the sheet metal frame member.

2. A foot pedal including a frame member, said frame member including a centrally disposed housing portion, a bearing mounted in the housing portion, said frame member having two pairs of arms deflected outwardly therefrom, each arm terminating in a radially disposed portion provided with an aperture, a pair of tread members provided with laterally disposed slots into which the radially disposed portions project, the tread members being provided with longitudinally extending apertures registering with the apertures in the radially disposed portions, and wire-like means positioned in the longitudinally disposed apertures in the tread members and projecting through the apertures in the radially disposed portions for holding the tread members in fixed relation with respect to the frame member.

3. A foot pedal including a sheet metal frame member, said sheet metal frame member including a tubular portion, said frame member having two pairs of arms deflected outwardly from the tubular portion, each arm terminating in a radially disposed portion, a pair of tread members provided with laterally disposed slots into which the radially disposed portions project, the tread members being provided with longitudinally extending apertures, and a wire-like member including a pair of arm-like portions extending through the apertures in the tread members permanently attached to the radially disposed portions of the arms for holding the tread members in fixed relation with respect to the sheet metal frame member.

4. A foot pedal including a frame member, said frame member including a centrally disposed sheet metal housing portion having edges joined by brazing, said frame member having two pairs of arms deflected outwardly therefrom, each arm terminating in a supporting portion, a pair of tread members provided with laterally disposed slots into which the supporting portions of the arms project, the tread members being provided with longitudinally extending apertures, and wire-like means positioned in the longitudinally extending apertures in the tread members and attached to the supporting portions of the arms for holding the tread members in fixed relation with respect to the frame member.

5. A foot pedal including a frame member, said frame member including a centrally disposed housing portion, said frame member having two pairs of arms deflected outwardly therefrom, each arm terminating in a supporting portion, a pair of tread members, longitudinally extending reenforcing members embedded in the tread members, the supporting portions of the arms being embedded in the tread members and attached to the reenforcing members for holding the tread members in fixed relation with respect to the frame member.

6. A frame member for use in supporting the tread members of a foot pedal upon a spindle, said tread members having rectangular laterally disposed slots intermediate the length of the tread members, said frame member including a centrally disposed sheet metal housing provided with a longitudinally extending cavity in which the spindle is mounted, said frame member including two pairs of sheet metal arms deflected outwardly from the housing and adapted to support tread members, said arms terminating in a pair of radially disposed projections seated in the rectangular laterally disposed slots, the distance between the radially disposed projections being less than the length of the tread members so that the radially disposed portions are adapted to support the tread members intermediate their ends.

7. A frame member for use in supporting the tread members of a pedal upon a spindle, each of said tread members having a pair of laterally disposed rectangular slots in spaced relation from each other and from the ends of the tread, said frame member including a centrally disposed tubular housing portion provided with a longitudinally extending cavity in which the spindle is mounted, said frame member including two pairs of arm portions deflected outwardly from the housing, each of said arm portions being provided with a transverse curvature having a radius of curvature substantially equal to the radius of the tubular portion, each of the arm portions terminating in radially disposed flat portions projecting into the slots in the tread members to support the same.

8. In a pedal for a bicycle, in combination, a bearing, a sheet metal tread support having a tubular center portion for supporting the bearing, a pair of diverging arms integral with one end of the tubular center portion, a second pair of diverging arms integral with the other end of the tubular center portion, and plastic tread portions located on opposite sides of the tubular center portion, each of said tread portions having a pair of slots, the ends of one arm of each pair of arms projecting into slots in one tread portion in spaced relation from the ends thereof, the ends of the other arms projecting into the slots in the tread portion located on the opposite side of the tubular center portion, and metallic reinforcing means spanning the distance between the arms projecting into each tread portion to reinforce the same.

9. In a pedal for a bicycle, the combination including a bearing, a sheet meal tubular housing for the bearing, tread means including a pair of tread portions one of which is located on one side of the tubular housing and the other on the opposite side of the tubular housing, each of the tread portions having a pair of spaced slots, a pair of arms integral with the tubular housing and projecting into the slots in the tread portion on one side of the tubular housing adjacent the ends thereof, a pair of arms integral with the tubular housing and projecting into the slots in the other tread portion in spaced relation from the ends thereof, and metallic reinforcing means spanning the distance between the ends of each pair of arms for reinforcing the tread portions.

10. In a pedal for a bicycle according to claim 9, wherein means are provided at one end of the tread portions spanning the distance between the tread portions for reinforcing the tread portions and to provide lateral stops.

References Cited in the file of this patent

UNITED STATES PATENTS

| Number | Name | Date |
|---|---|---|
| 512,871 | Curtis | Jan. 16, 1894 |
| 541,238 | Kendall | June 18, 1895 |
| 598,675 | Lloyd | Feb. 8, 1898 |
| 801,574 | Diament | Oct. 10, 1905 |
| 1,180,958 | Tilton | Apr. 25, 1916 |
| 1,425,215 | Persons | Aug. 8, 1922 |
| 1,554,527 | Saalfrank | Sept. 22, 1925 |
| 1,567,775 | Wagner | Dec. 29, 1925 |
| 1,896,590 | Place | Feb. 7, 1933 |
| 1,986,586 | Lovenston | Jan. 1, 1935 |
| 2,036,655 | Storaasli | Apr. 7, 1936 |
| 2,170,483 | Place | Aug. 22, 1939 |
| 2,178,921 | Schwin | Nov. 7, 1939 |

FOREIGN PATENTS

| Number | Country | Date |
|---|---|---|
| 9,724 | Sweden | July 15, 1898 |
| 53,210 | Germany | Dec. 28, 1889 |
| 432,324 | Italy | Mar. 15, 1948 |
| 637,352 | Great Britain | May 17, 1950 |